B. W. STOUFFER.
JOINT AND COUPLING.
APPLICATION FILED JULY 23, 1910.
1,002,774.
Patented Sept. 5, 1911.
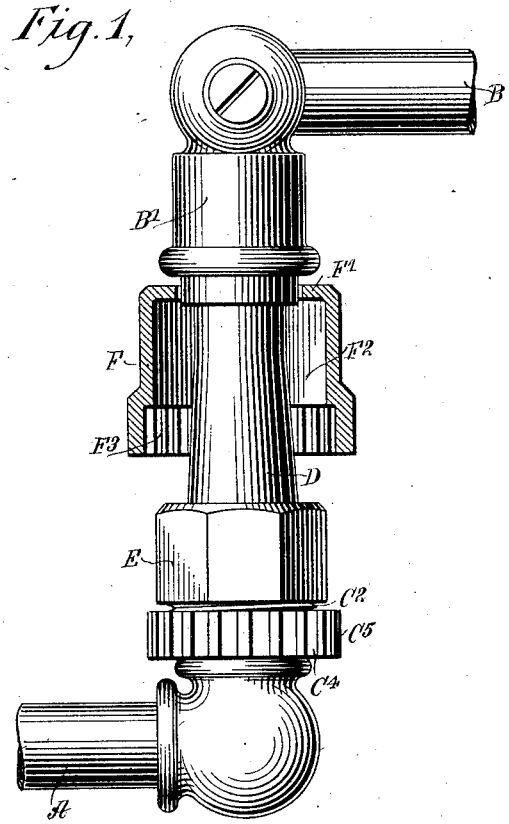
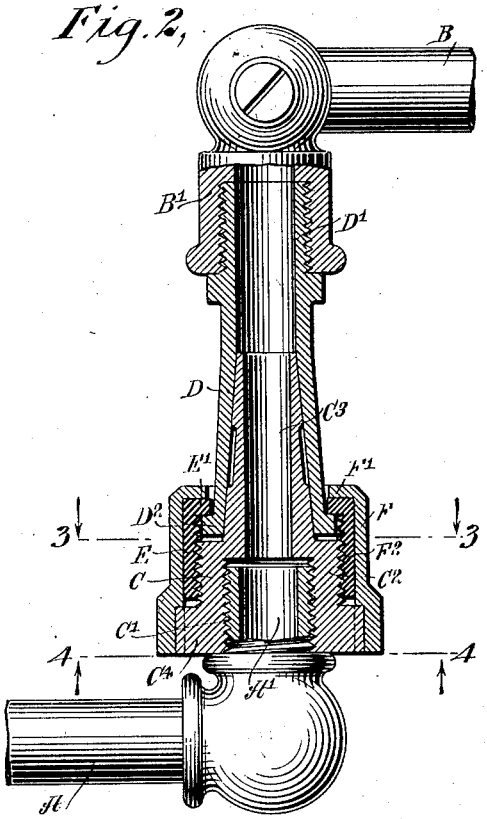
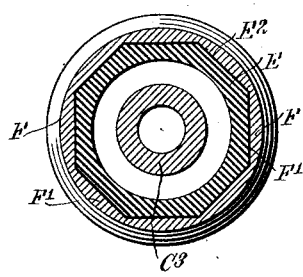
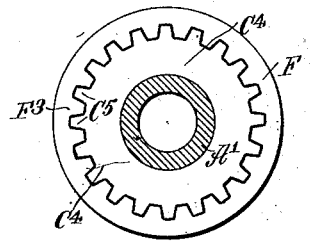
WITNESSES:
INVENTOR
Benjamin W. Stouffer
BY
ATTORNEYS

UNITED STATES PATENT OFFICE.

BENJAMIN W. STOUFFER, OF PITTSBURG, PENNSYLVANIA.

JOINT AND COUPLING.

1,002,774. Specification of Letters Patent. Patented Sept. 5, 1911.

Application filed July 23, 1910. Serial No. 573,509.

*To all whom it may concern:*

Be it known that I, BENJAMIN W. STOUFFER, a citizen of the United States, and a resident of Pittsburg, in the county of Allegheny and State of Pennsylvania, have invented a new and Improved Joint and Coupling, of which the following is a full, clear, and exact description.

The object of the invention is to provide a new and improved joint and coupling, more especially designed for use as a swing joint, socket joint, coupling or other gas fixture, and arranged to permit of conveniently placing the joint or coupling in position on any desired fixture without the aid of tools and without danger of leakage or the parts becoming accidentally disassembled or separated.

For the purpose mentioned, use is made of a nipple having a conical end, a correspondingly-shaped pipe fitting the said conical end and having a flange at its base end, and a union nut screwing on the said nipple and engaging the said flange to draw the pipe tight on the conical end of the nipple.

A practical embodiment of the invention is represented in the accompanying drawings forming a part of this specification, in which similar characters of reference indicate corresponding parts in all the views.

Figure 1 is a side elevation of the socket joint, showing the locking cap in section and disengaged from the union nut and the base of the nipple; Fig. 2 is a sectional side elevation of the socket joint; Fig. 3 is a sectional plan view of the same on the line 3—3 of Fig. 2; and Fig. 4 is an inverted sectional plan view of the same on the line 4—4 of Fig. 2.

The socket joint, as shown in Figs. 1 and 2, connects the pipes A and B of a gas fixture with each other, and for this purpose use is made of a nipple C having an interior screw thread C′ screwing on the threaded end A′ of the pipe A, as plainly indicated in Fig. 2. The nipple C is also provided with an external screw thread $C^2$ and a conical end $C^3$, onto which fits a correspondingly-shaped pipe D, provided at its upper end with an external screw thread D′ screwing into the head B′ of the pipe B. Other suitable means may be employed for fastening the pipe D to the pipe B. The pipe D is provided at its base end with an annular outwardly-extending flange $D^2$, engaged by the inwardly-extending flange E′ of a union nut E, screwing on the exterior screw thread $C^2$ of the nipple C. Thus when the union nut E is screwed down, the conical pipe D is drawn firmly on the conical end $C^3$ of the nipple C, to provide an absolutely gas-tight joint.

The union nut E is preferably locked in place on the nipple C by a suitable fastening means, preferably a locking cap F, provided at its upper end with an inwardly-extending flange F′, adapted to be seated on the top of the flange E′ of the union nut E, as plainly indicated in Fig. 2. The cap F has its upper portion formed at the inside with a polygonal surface $F^2$, fitting onto the corresponding external polygonal surface of the union nut E, and the lower portion of the locking cap F is provided at the inside with teeth $F^3$ meshing with teeth $C^5$ formed on the base $C^4$ of the nipple C. Thus the locking cap F is supported on the union nut E and is held against turning by the teeth $F^3$ being in mesh with the teeth $C^5$, and as the locking cap F fits onto the union nut E, the latter is prevented from turning and hence the parts forming the socket joint cannot become accidentally disassembled or separated.

One of the special features of this joint and coupling, as shown in the drawing for my lock for swing joints, is that if the stationary gas fixtures in a building are provided with an inner cone C and the other parts of the joint are attached to a portable gas fixture or gas appliance, the portable gas fixture or gas appliance with the said parts of the socket joint thereto attached can be readily detached from the stationary gas fixture it is connected to and taken to another and attached to it. If it is desired to economize in the number of gas lights, that part of the gas burner intended to screw on the nozzle of the fixture may be attached or screwed on the head $B^1$ at the upper end of the pipe D shown in the drawing; or the gas light may be detached from the fixture it is on by separating the socket joint, and the gas light with the parts attached to the gas light can be taken to another fixture and attached to it.

Although I have shown and described the improvement in all its details, it is understood that I do not limit myself to the exact construction shown and described, as the same may be varied without deviating from the spirit of my invention.

Having thus described my invention, I claim as new and desire to secure by Letters Patent:

1. A joint and coupling for fixtures, comprising a nipple having a conical end, a correspondingly-shaped pipe fitting the said conical end and having a flange at its base end, a union nut screwing on the said nipple and engaging the said flange to draw the pipe tight on the conical end of the nipple, and means fitting upon the said union nut and having interlocking engagement with the nipple to hold the nut against turning.

2. A joint and coupling or fixtures, comprising a nipple having a conical end, an exterior thread and an interior thread for screwing onto a member of the fixture, a conical pipe fitting over the said conical end and having a flange at its base end and a thread at its apex end for connection with another member of the fixture, a union nut screwing on the said exterior thread of the nipple and engaging the said pipe flange to draw the pipe tight on the conical end of the nipple, and means fitting upon the nut and having interlocking engagement with the nipple for preventing the nut from turning.

3. A joint and coupling for fixtures, comprising a nipple having a conical end, a correspondingly-shaped pipe fitting the said conical end and having a flange at its base end, a union nut screwing on the said nipple and engaging the said flange to draw the pipe tight on the conical end of the nipple, and a cap fitting over the said union nut to hold the latter from turning and engaging the said nipple to be held by the latter against turning.

4. A joint and coupling for fixtures, comprising a nipple having a conical end, an exterior screw thread, a base provided with peripheral teeth and an internal screw thread for engagement with one member of the fixture, a conical pipe fitting over the said conical end of the nipple and provided at its base with a flange and at its apex end with a screw thread for engagement with another member of the fixture, a union nut screwing on the said exterior screw thread of the nipple and engaging the said pipe flange to draw the pipe tight on the conical end of the nipple, the exterior surface of the said union nut being polygonal, and a cap having the upper portion of its interior surface polygonal for engagement with the said polygonal exterior surface of the said union nut, the cap being provided interiorly at its lower portion with teeth adapted to mesh with the teeth on the base of the said nipple.

5. A joint and coupling for fixtures, comprising a nipple having a conical end, a conical pipe engaging the said conical end, a union nut screwing on the said nipple and engaging the said pipe to draw the latter tight on the said nipple, and a locking cap engaging the said nipple and held by the latter against turning and engaging the said union nut to hold the latter against turning.

In testimony whereof I have signed my name to this specification in the presence of two subscribing witnesses.

BENJAMIN W. STOUFFER.

Witnesses:
A. C. DRURY,
JOHN HAAS.